(12) United States Patent
McGaughy

(10) Patent No.: US 10,625,783 B1
(45) Date of Patent: Apr. 21, 2020

(54) C-NOTCH SYSTEMS AND METHODS

(71) Applicant: Steve McGaughy, Fresno, CA (US)

(72) Inventor: Steve McGaughy, Fresno, CA (US)

(*) Notice: Subject to any disclaimer, the term of this patent is extended or adjusted under 35 U.S.C. 154(b) by 71 days.

(21) Appl. No.: 16/173,785

(22) Filed: Oct. 29, 2018

Related U.S. Application Data

(63) Continuation-in-part of application No. 29/666,768, filed on Oct. 16, 2018.

(51) Int. Cl.
*B62D 21/02* (2006.01)

(52) U.S. Cl.
CPC .... *B62D 21/02* (2013.01); *B60G 2204/43065* (2013.01)

(58) Field of Classification Search
CPC ..................................................... B62D 21/02
USPC ............................................ 296/204, 29, 30
See application file for complete search history.

(56) References Cited

U.S. PATENT DOCUMENTS

| | | | |
|---|---|---|---|
| 3,279,815 A | 10/1966 | Hutchens | |
| 5,324,133 A * | 6/1994 | Kreis | B62D 21/152 228/119 |
| 6,003,898 A * | 12/1999 | Teply | B62D 29/008 280/781 |
| 6,293,618 B1 * | 9/2001 | Sukegawa | B62D 25/04 296/203.01 |
| 9,139,235 B2 * | 9/2015 | Craig | B62D 25/025 |
| 2004/0232646 A1 | 11/2004 | Peters et al. | |
| 2009/0173033 A1 | 7/2009 | Baxter, Jr. | |
| 2016/0121929 A1 | 5/2016 | Levin et al. | |
| 2016/0263957 A1 | 9/2016 | Legros et al. | |
| 2018/0264904 A1 | 9/2018 | McCloud | |

* cited by examiner

*Primary Examiner* — Joseph D. Pape
(74) *Attorney, Agent, or Firm* — Acuity IP, LLC; Nathan S. Cassell

(57) ABSTRACT

C-notch systems and methods for providing additional clearance or travel between the frame rail and the axle of a vehicle. Exemplary C-notch systems include a bottom brace, an outer brace, an inner brace, an outer fastener, an inner fastener, a front bottom fastener, and a rear bottom fastener. The outer brace and the inner brace can each have a notch that receives at least a portion of a vehicle bed rail.

21 Claims, 15 Drawing Sheets

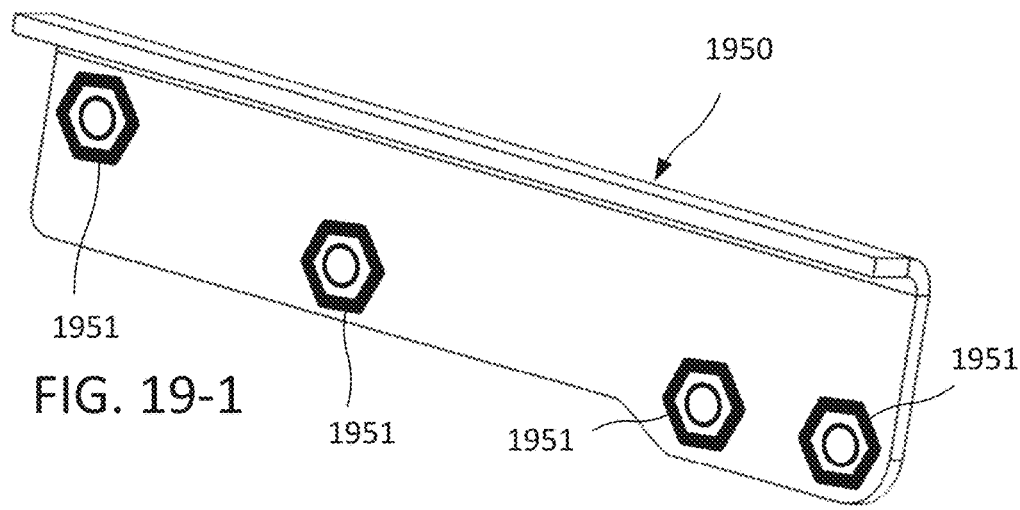
FIG. 19-1
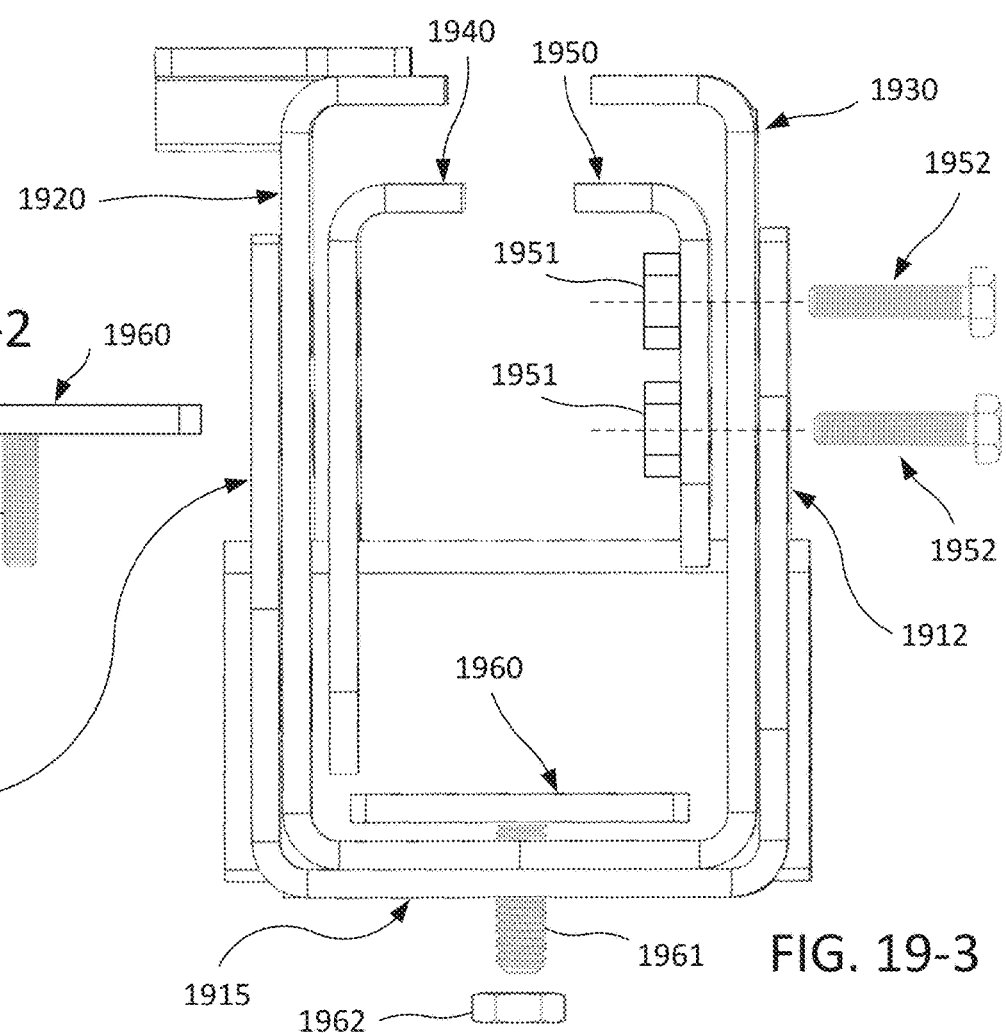
FIG. 19-2
FIG. 19-3

US 10,625,783 B1

C-NOTCH SYSTEMS AND METHODS

CROSS-REFERENCES TO RELATED APPLICATIONS

This application is a continuation-in-part of application Ser. No. 29/666,768 filed Oct. 16, 2018, the content of which is incorporated herein by reference.

BACKGROUND OF THE INVENTION

Embodiments of the present invention relate generally to systems and methods for lowering the chassis of a vehicle, and in particular, to C-notch systems and methods.

The main supporting structure of a motor vehicle is the chassis, which can also include or be referred to as the vehicle frame. A C-notch is a reinforced cutout in the frame rail of a vehicle that allows for additional clearance or travel between the frame rail and the vehicle axle when the vehicle frame is lowered. Typically, a notch is placed in the frame, above the axle. The C-notch allows the axle to travel in an upward direction under the frame, and into the notch where the frame rail would otherwise be located. Because the installation of a C-notch assembly changes the structure and geometry of the vehicle chassis, there is a risk of diminished handling and performance following installation.

Although currently available C-notch systems can be used to add clearance between the axle and frame when lowering the chassis of a vehicle, still further improvements are desired. Embodiments of the present invention address at least some of these outstanding needs.

BRIEF SUMMARY OF THE INVENTION

Embodiments herein described include systems and methods for installing a C-notch in the frame of a vehicle.

In one aspect, embodiments of the present invention encompass C-notch systems for attaching to a frame rail of a vehicle. Exemplary systems can include a bottom brace, an outer brace, an inner brace, an outer fastener, an inner fastener, a front bottom fastener, and a rear bottom fastener. The bottom brace can include an outer panel, an inner panel, a front lower panel, a C-panel, and a rear lower panel. The outer panel can include a front portion, a central C-portion, and a rear portion. The inner panel can include a front portion, a central C-portion, and a rear portion. The front lower panel can be disposed between the front portion of the outer panel and the front portion of the inner panel. The C-panel can be disposed between the central C-portion of the outer panel and the central C-portion of the inner panel. The rear lower panel can be disposed between the rear portion of the outer panel and the rear portion of the inner panel. The outer brace can have a front portion that includes an upper ledge and a lower ledge, a central C-portion, and a rear portion that includes an upper ledge and a lower ledge. The inner brace can have a front portion that includes an upper ledge and a lower ledge, a central C-portion, and a rear lower portion that includes an upper ledge and a lower ledge. The outer fastener can have an upper ledge. The inner fastener can have an upper ledge.

According to some embodiments, the lower ledge of the outer brace front portion and the lower ledge of the inner brace front portion are configured for a joint engagement. In some cases, the lower ledge of the outer brace rear portion and the lower ledge of the inner brace rear portion are configured for a joint engagement. In some cases, the lower ledge of the outer brace front portion and the lower ledge of the inner brace front portion are configured for a finger joint engagement. In some cases, the lower ledge of the outer brace rear portion and the lower ledge of the inner brace rear portion are configured for a finger joint engagement. According to some embodiments, the outer fastener includes at least one welded hex nut. In some cases, the inner fastener includes at least one welded hex nut. In some cases, the front bottom fastener includes at least one welded bolt stud. In some cases, the rear bottom fastener includes at least one welded bolt stud. In some cases, the upper ledge of the outer brace has a gap or notch such that the upper ledge includes a front upper ledge and a rear upper ledge. In some cases, the upper ledge of the inner brace has a gap or notch such that the upper ledge includes a front upper ledge and a rear upper ledge.

In another aspect, embodiments of the present invention encompass methods for installing a C-notch system on a frame rail of a vehicle. In exemplary embodiments, methods may include removing a portion of the frame rail to create a notch in the frame rail, positioning an inner fastener within the interior of the frame rail, positioning an outer fastener within the interior of the frame rail, positioning a front bottom fastener within the interior of the frame rail, in front of the notch, positioning a rear bottom fastener within the interior of the frame rail, behind the notch, positioning an inner brace exterior to the frame rail, positioning an outer brace exterior to the frame rail, positioning a bottom brace exterior to the frame rail, fixing the outer brace and the outer fastener relative to an outer wall of the frame rail, fixing the inner brace and the inner fastener relative to an inner wall of the frame rail, fixing the front bottom fastener and a front lower panel of the bottom brace relative to a bottom wall of the frame rail, in front of the notch, and fixing the rear bottom fastener and a rear lower panel of the bottom brace relative to the bottom wall of the frame rail, behind the notch. In some cases, methods may include positioning an upper ledge notch of the outer brace to receive a bottom portion of a vehicle bed rail. In some cases, methods may include positioning an upper ledge notch of the inner brace to receive a bottom portion of a vehicle bed rail. In some cases, methods may include positioning a wing brace seat of the outer brace to receive a bottom portion of a vehicle bed rail.

According to some embodiments, methods may include engaging a front engagement section of the outer brace with a front engagement section of the inner brace. In some cases, the front engagement section of the outer brace and the front engagement section of the inner brace can be engaged with a joint. In some cases, the front engagement section of the outer brace and the front engagement section of the inner brace can be engaged with a finger joint. In some cases, methods can include engaging a rear engagement section of the outer brace with a rear engagement section of the inner brace. In some cases, the rear engagement section of the outer brace and the rear engagement section of the inner brace are engaged with a joint. In some cases, the rear engagement section of the outer brace and the rear engagement section of the inner brace are engaged with a finger joint.

BRIEF DESCRIPTION OF THE DRAWINGS

Embodiments of the invention will become more fully apparent from the following detailed description, the appended claims, and the accompanying drawings in which like reference numerals identify similar or identical elements.

FIGS. 19-1, 19-2, and 19-3 depicts aspects of a C-notch assembly and installation method, according to embodiments of the present invention.

DETAILED DESCRIPTION OF THE INVENTION

Embodiments of the present invention encompass systems and methods for installing a C-notch in the frame of a vehicle. Exemplary C-notch systems according to embodiments of the present invention operate to provide a vehicle with excellent suspension and travel performance when the chassis of the vehicle is lowered. C-notch systems disclosed herein allow a pickup truck, for example, to haul substantial loads and/or to pull trailers without sacrificing structural performance of the vehicle when the chassis is lowered.

Figure 1:
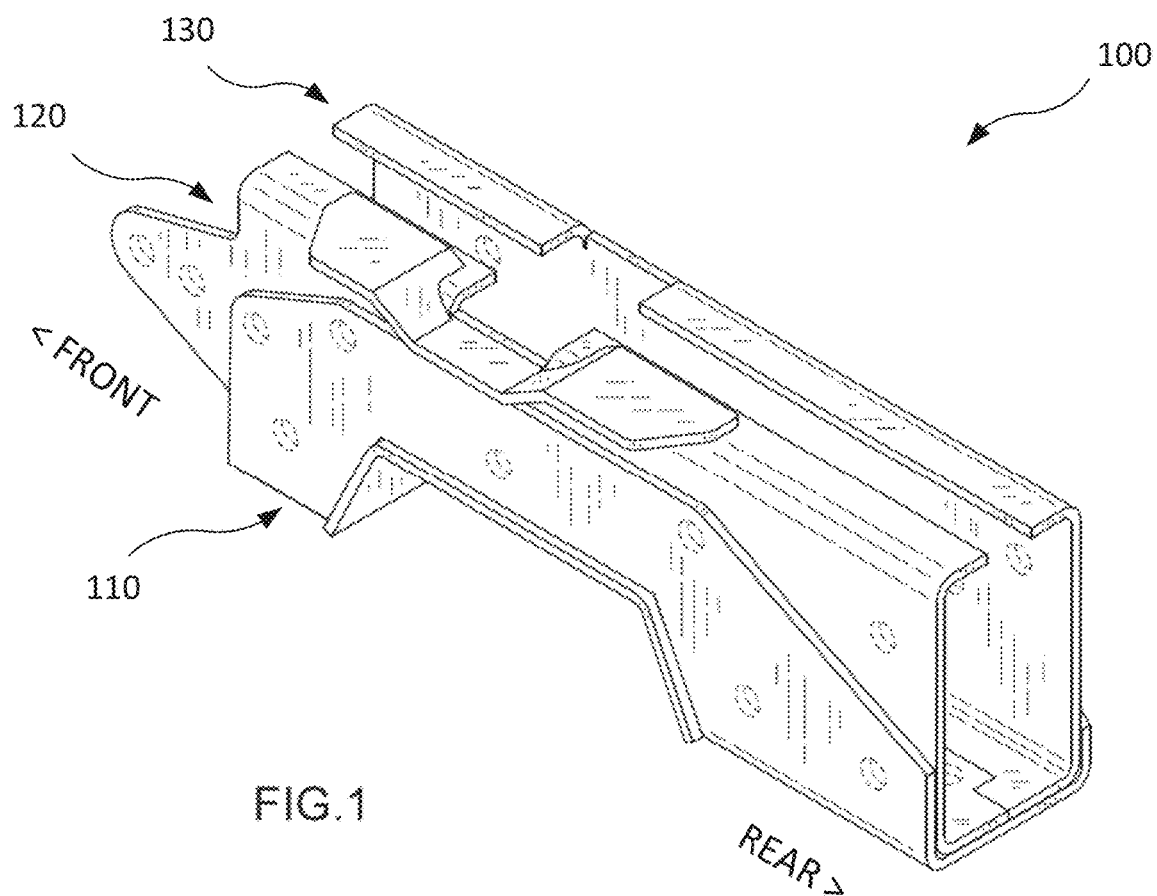
FIG. 1 is a top perspective view of a C-notch assembly according to embodiments of the present invention.

Turning now the drawings, FIG. 1 depicts a top perspective view of a C-notch brace assembly 100 according to embodiments of the present invention. Brace assembly 100 includes a bottom brace 110, an outer brace 120, and an inner brace 130. The C-notch brace assembly described here is configured for installation on the driver side of the vehicle. It is understood that the instant disclosure also encompasses a similar C-notch brace assembly configured for installation on the passenger side of the vehicle as well (e.g. in mirror image).

Figure 2:
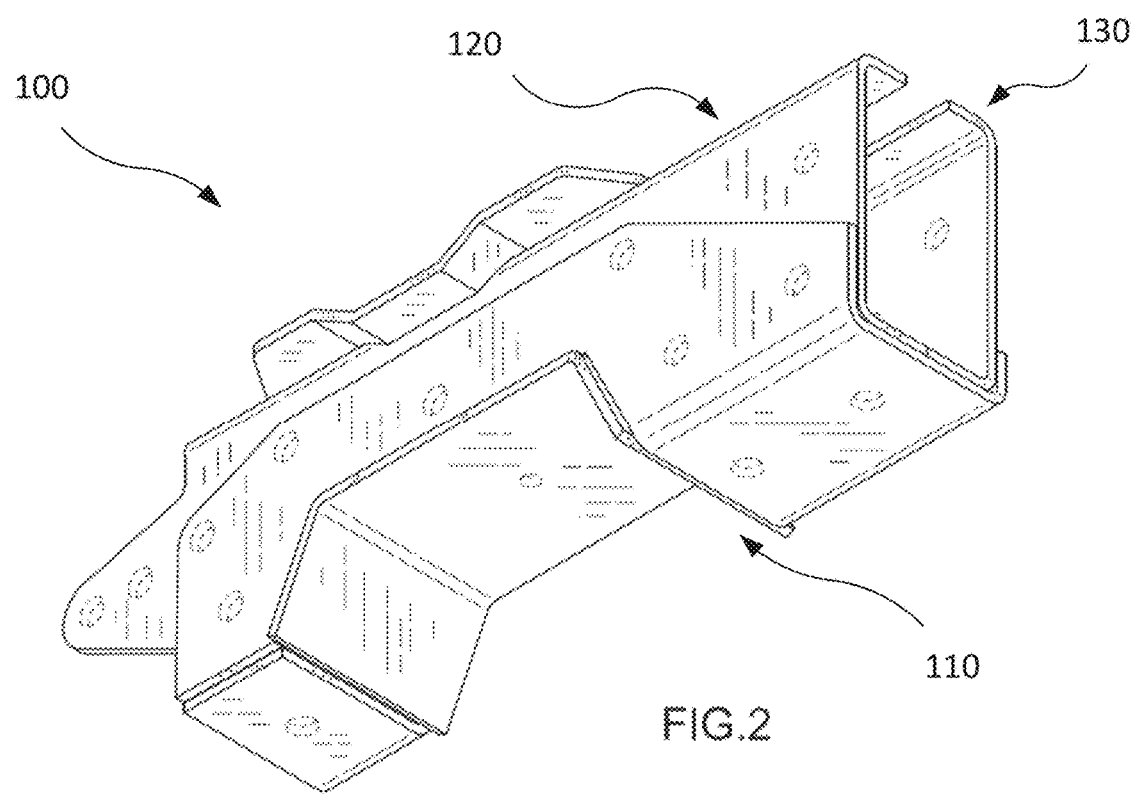
FIG. 2 is a bottom perspective view of a C-notch assembly according to embodiments of the present invention.

FIG. 2 depicts a bottom perspective view of a C-notch brace assembly 100 according to embodiments of the present invention. Brace assembly 100 includes a bottom brace 110, an outer brace 120, and an inner brace 130. As discussed elsewhere herein, outer brace 120 and inner brace 130 can be used as tracing templates, to help facilitate cutting of a vehicle frame rail in the proper places.

Figure 3:
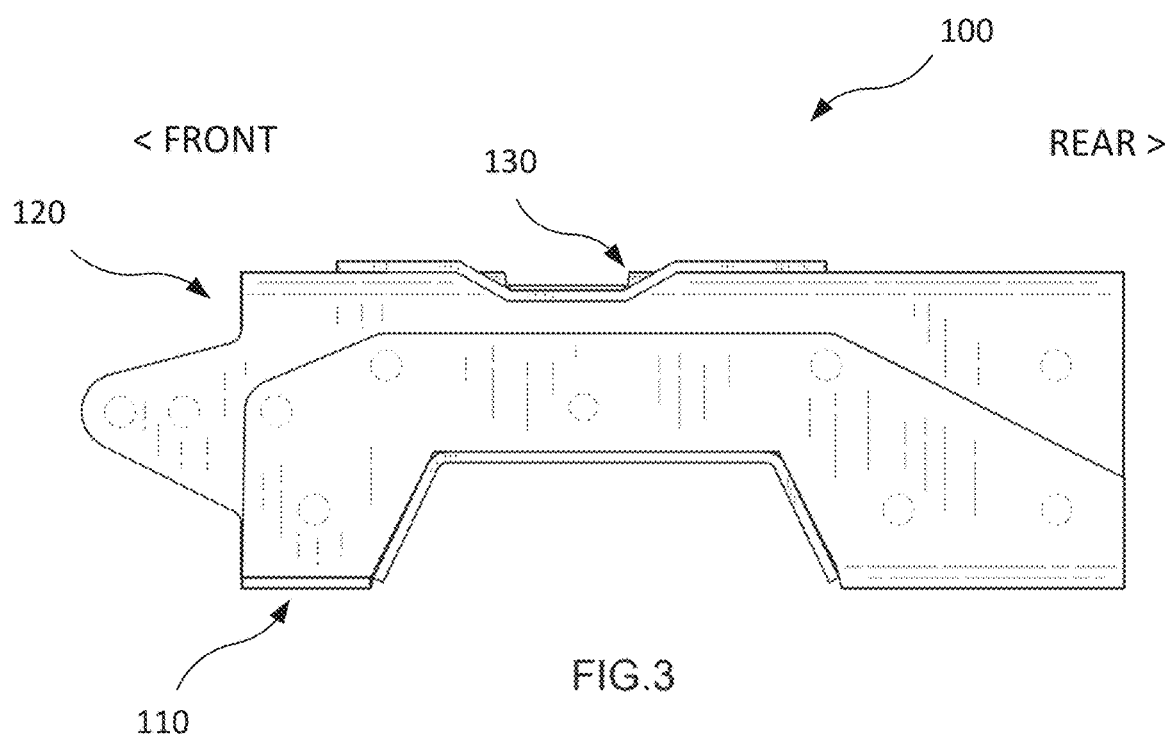
FIG. 3 is a front elevational view of a C-notch assembly according to embodiments of the present invention.

FIG. 3 depicts a front elevational view of a C-notch brace assembly 100 according to embodiments of the present invention. Brace assembly 100 includes a bottom brace 110, an outer brace 120, and an inner brace 130.

Figure 4:
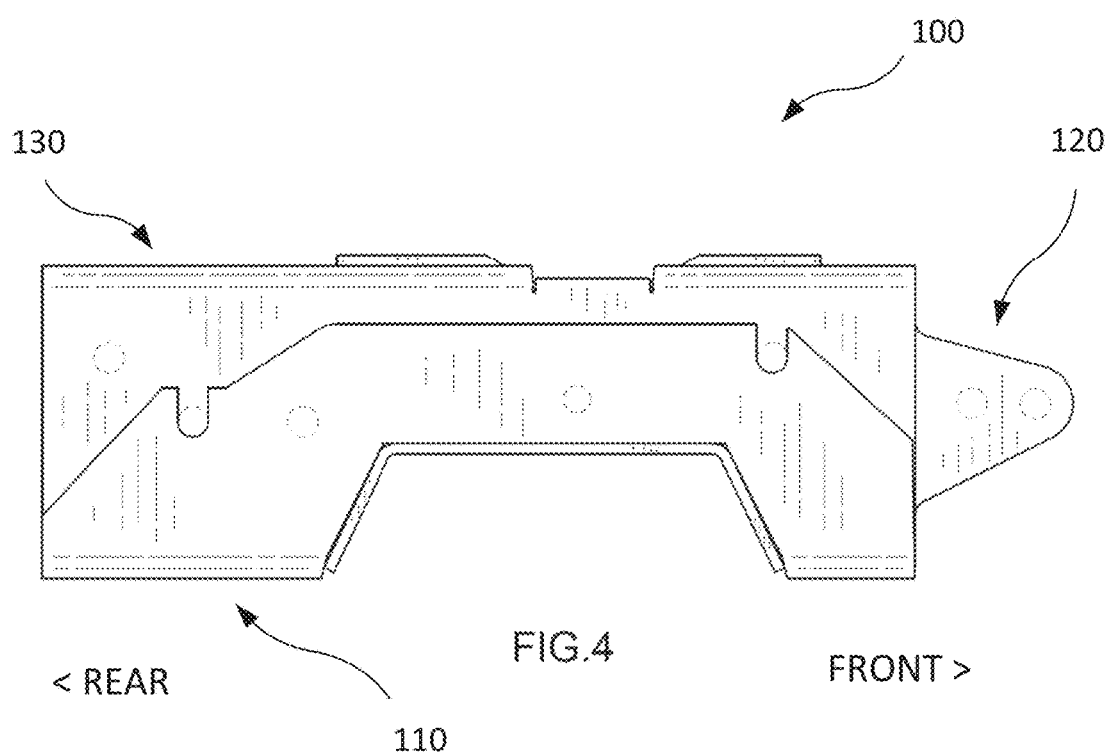
FIG. 4 is a rear elevational view of a C-notch assembly according to embodiments of the present invention.

FIG. 4 depicts a rear elevational view of a C-notch brace assembly 100 according to embodiments of the present invention. Brace assembly 100 includes a bottom brace 110, an outer brace 120, and an inner brace 130.

Figure 5:
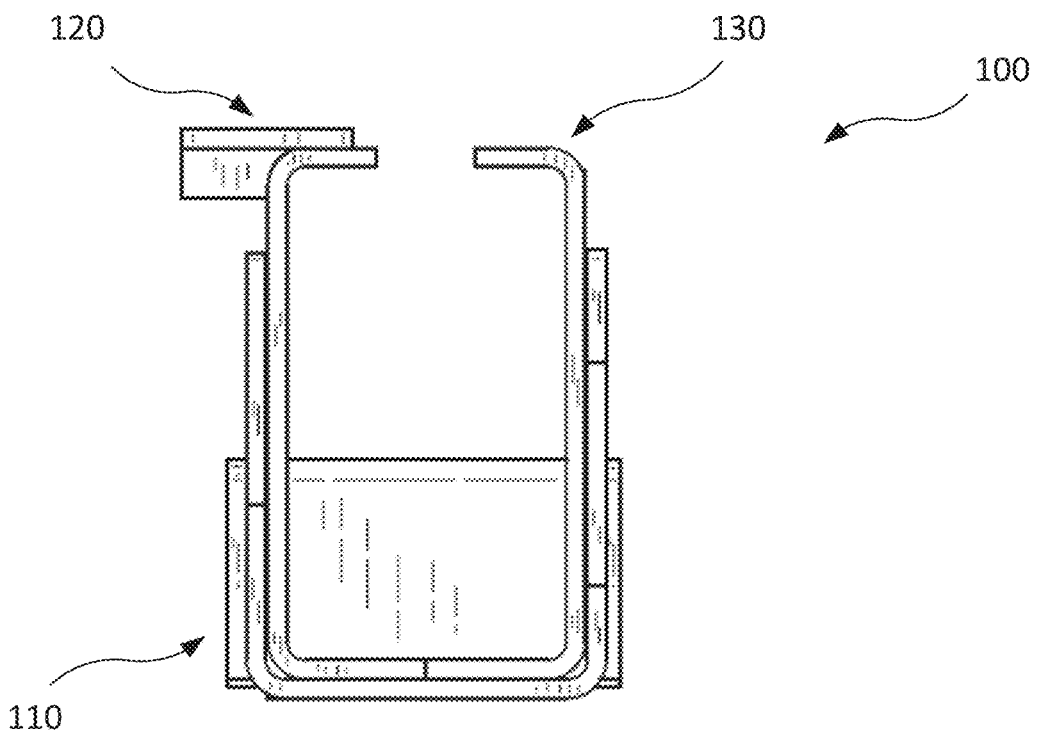
FIG. 5 is a right side elevational view of a C-notch assembly according to embodiments of the present invention.

FIG. 5 depicts a right side elevational view of a C-notch brace assembly 100 according to embodiments of the present invention. Brace assembly 100 includes a bottom brace 110, an outer brace 120, and an inner brace 130.

Figure 6:
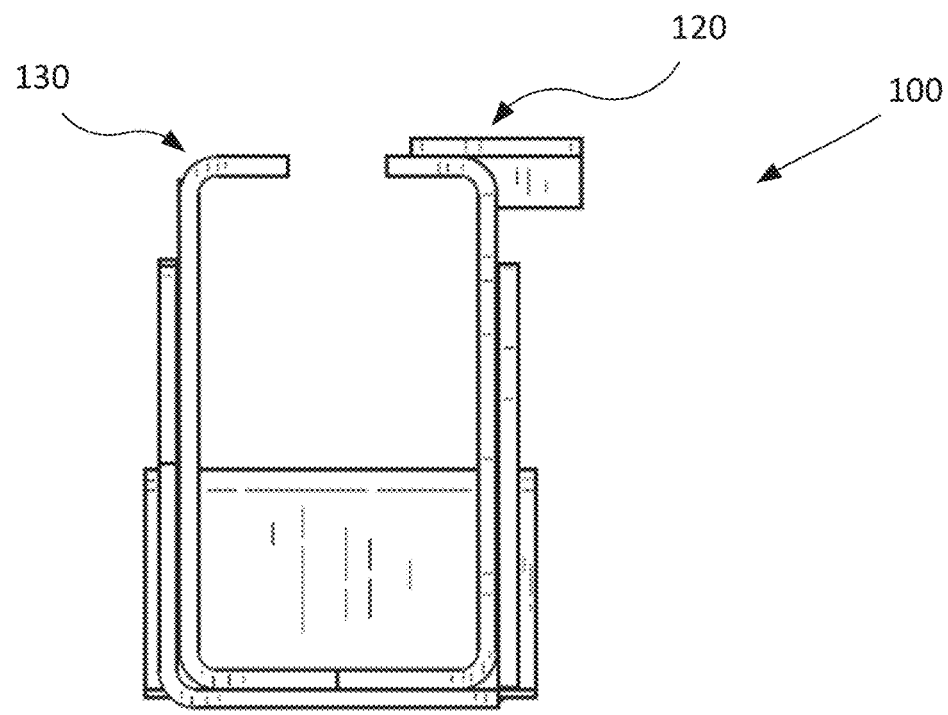
FIG. 6 is a left side elevational view of a C-notch assembly according to embodiments of the present invention.

FIG. 6 depicts a left side elevational view of a C-notch brace assembly 100 according to embodiments of the present invention. Brace assembly 100 includes a bottom brace 110, an outer brace 120, and an inner brace 130.

Figure 7:
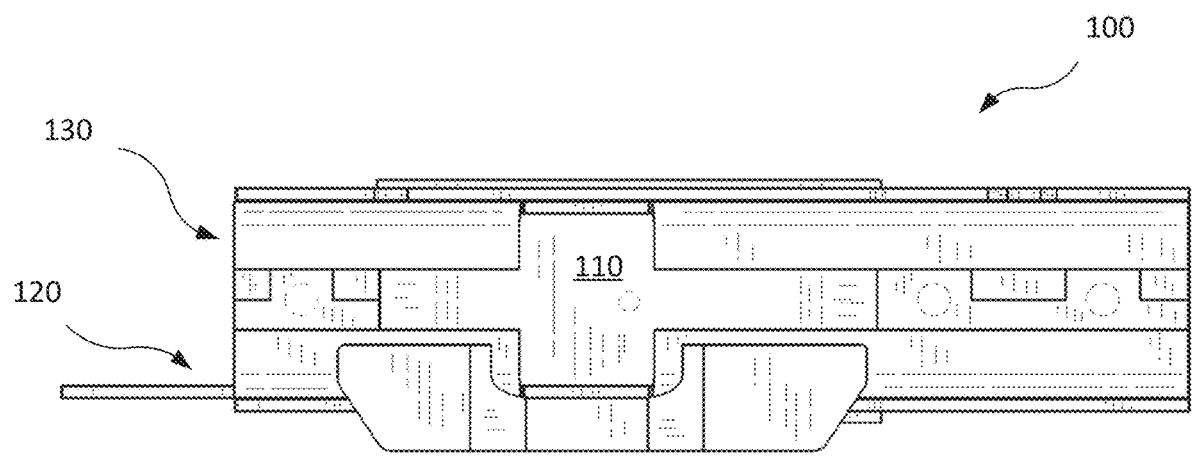
FIG. 7 is a top plan view of a C-notch assembly according to embodiments of the present invention.

FIG. 7 depicts a top plan view of a C-notch brace assembly 100 according to embodiments of the present invention. Brace assembly 100 includes a bottom brace 110, an outer brace 120, and an inner brace 130.

Figure 8:
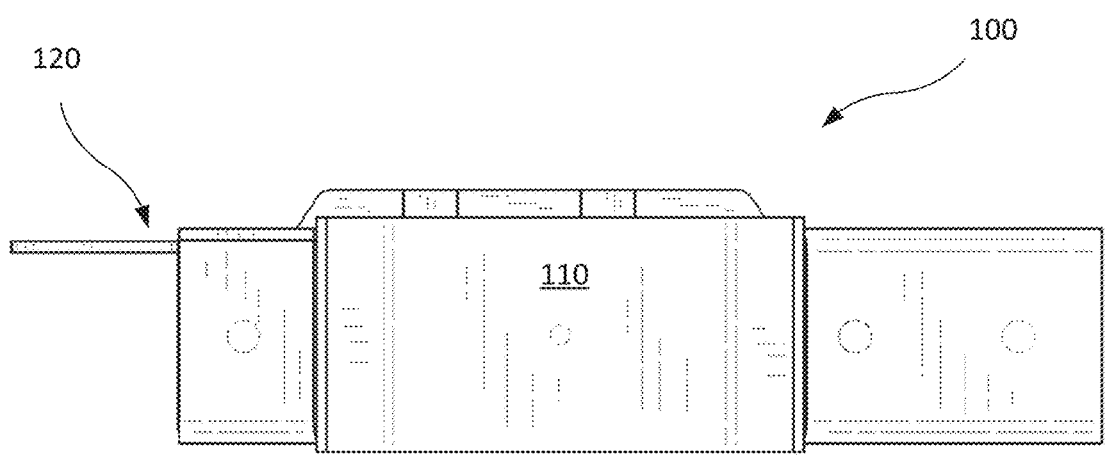
FIG. 8 is a bottom plan view of a C-notch assembly according to embodiments of the present invention.

FIG. 8 depicts a bottom plan view of a C-notch brace assembly 100 according to embodiments of the present invention. Brace assembly 100 includes a bottom brace 110, an outer brace 120, and an inner brace (not shown).

Figure 9:
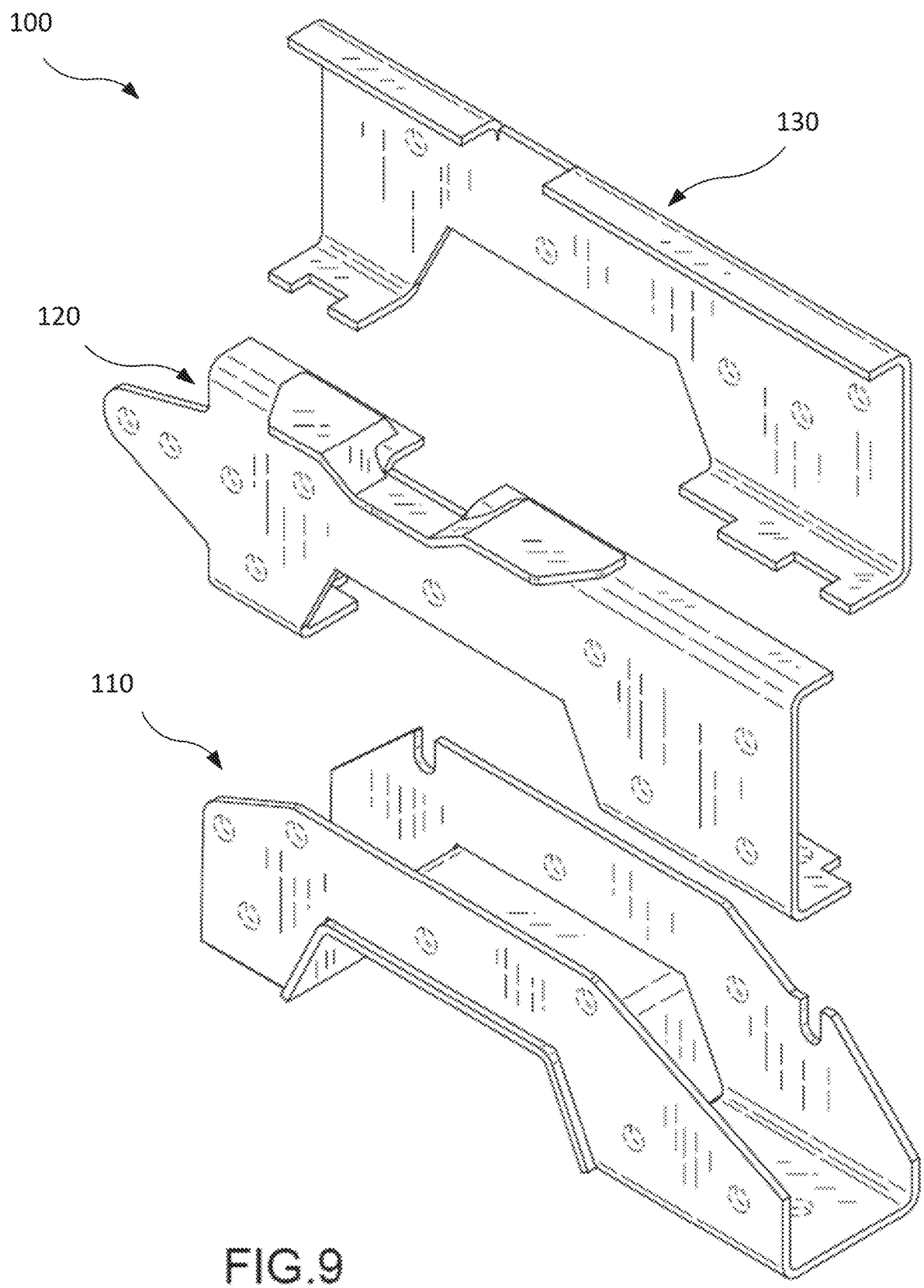
FIG. 9 is an exploded perspective view of a C-notch assembly according to embodiments of the present invention.

FIG. 9 depicts an exploded perspective view of a C-notch brace assembly 100 according to embodiments of the present invention. Brace assembly 100 includes a bottom brace 110, an outer brace 120, and an inner brace 130.

Figure 10A:
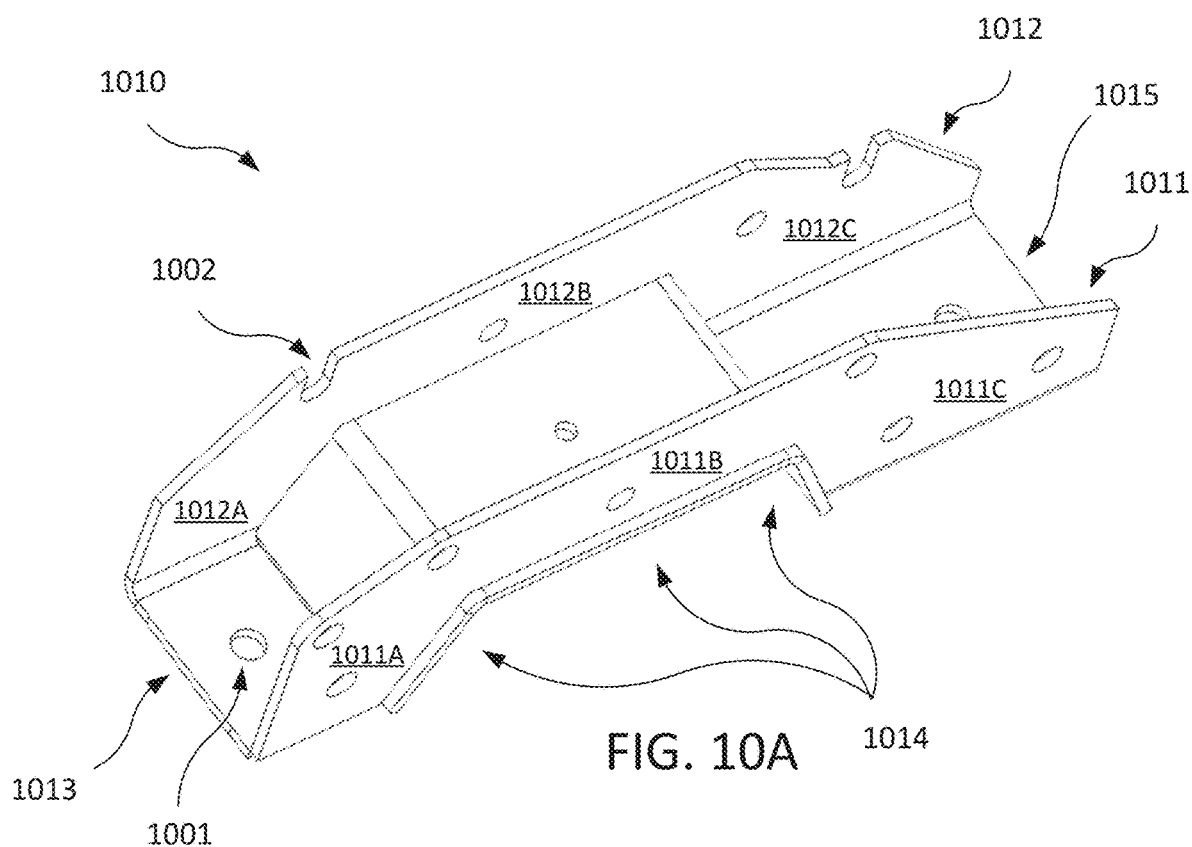
FIGS. 10A and 10B depict aspects of a bottom brace according to embodiments of the present invention.
Figure 10B:
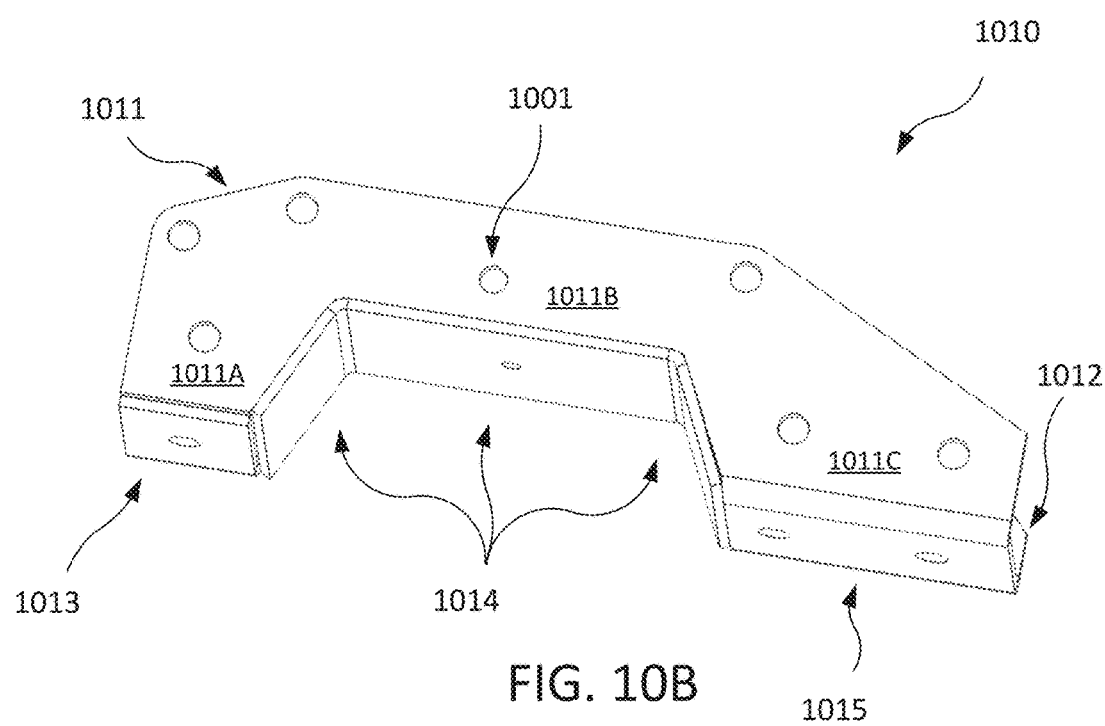

FIGS. 10A and 10B depict aspects of a bottom brace 1010 according to embodiments of the present invention. As shown here, bottom brace 1010 includes an outer panel 1011, an inner panel 1012, a front lower panel 1013, a central C-panel 1014, and a rear lower panel 1015. The outer panel 1011 has a front portion 1011A, a central C-portion 1011B, and a rear portion 1011C. The inner panel 1012 has a front portion 1012A, a central C-portion 1012B, and a rear portion 1012C. The front lower panel 1013 is disposed between the front portion 1011A of the outer panel 1011 and the front portion 1012A of the inner panel 1012. As shown here, front lower panel 1013 is coupled with front portion 1011A, front portion 1012A, and central C-panel 1014. The central C-panel assembly 1014 is disposed between the central C-portion 1011B of the outer panel 1011 and the central C-portion 1012B of the inner panel 1012. The rear lower panel 1015 is disposed between the rear portion 1011C of the outer panel 1011 and the rear portion 1012C of the inner panel 1012. As shown here, rear lower panel 1015 is coupled with rear portion 1011C, rear portion 1012C, and central C-panel 1014. Various components of a C-notch assembly may include apertures or holes 1001, slots 1002, and the like, for receiving bolt studs or other fixation mechanisms (see e.g. FIGS. 19-2 and 19-3) that operate to fix the components to the frame rail of a vehicle.

Figure 11:
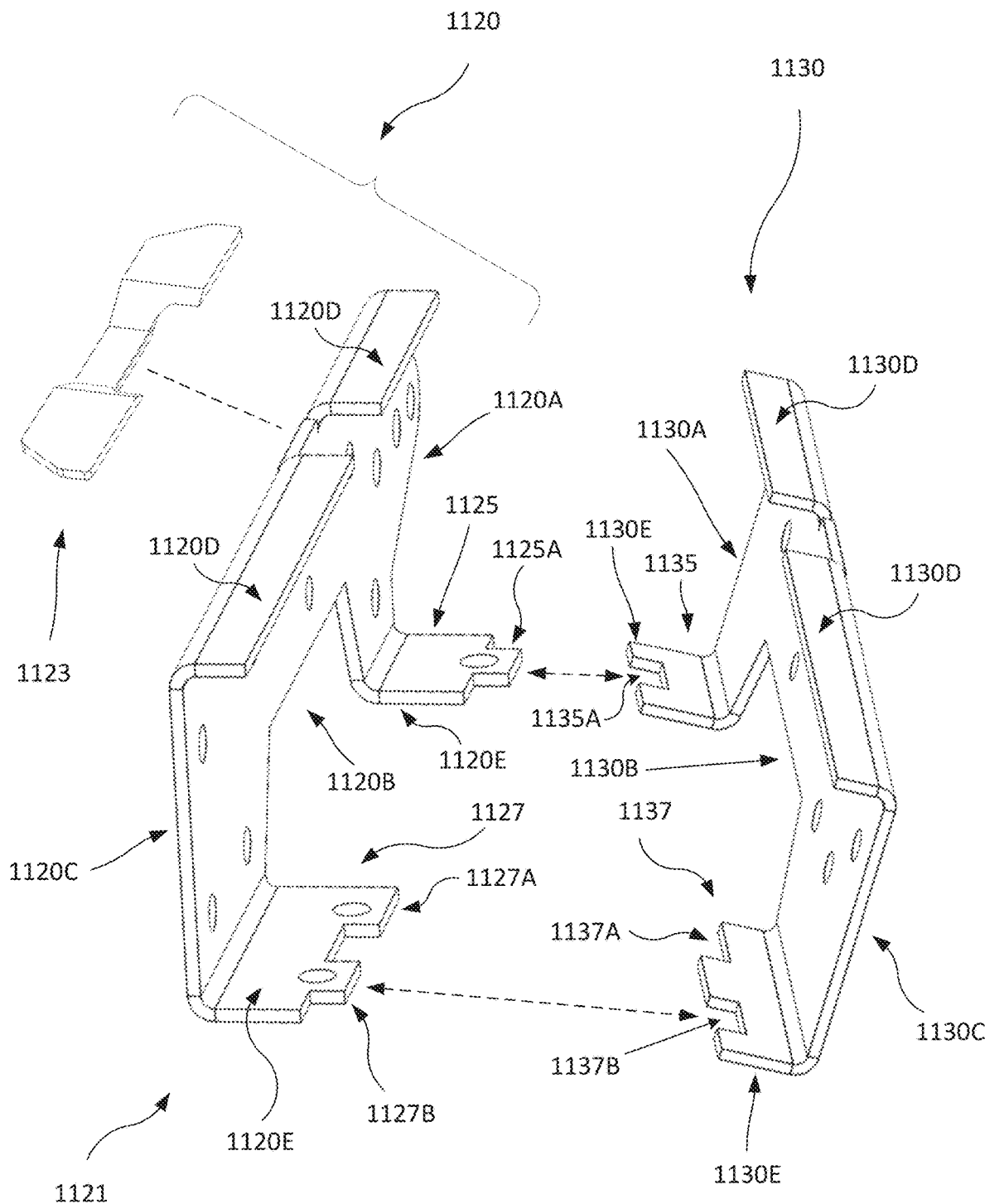
FIG. 11 depicts aspects of an outer brace and an inner brace according to embodiments of the present invention.

FIG. 11 depicts aspects of an outer brace 1120 and an inner brace 1130 according to embodiments of the present invention. As shown here, outer brace 1120 can include a main brace 1121 and a wing brace 1123. Although they are depicted as separate elements here, in some embodiments main brace 1121 and wing brace 1123 are permanently fixed (e.g. welded) together. Outer brace 1120 includes a lower ledge 1120E having a front engagement section 1125 and a rear engagement section 1127. Front engagement section 1125 includes tab or finger 1125A. Rear engagement section 1127 includes tabs or fingers 1127A, 1127B. Similarly, inner brace 1130 includes a lower ledge 1130E having a front engagement section 1135 and a rear engagement section 1137. Front engagement section 1135 includes a recess 1135a configured to receive tab 1125A. Rear engagement section 1137 includes a recess or notch 1137A configured to receive tab 1127A and a recess or notch 1137B configured to receive tab 1127B.

As discussed elsewhere herein, when the C-notch brace assembly is attached to the frame of a vehicle, the front engagement sections 1125, 1135 are engaged with one another (e.g. in an interlocking finger joint), and the rear engagement sections 1127, 1137 are engaged with one another (e.g. in an interlocking finger joint). This engagement (e.g. interlocking finger joint) can provide enhanced structural integrity to the C-notch system. Other joint configurations can be used to join outer brace 1120 and inner brace 1130, including tongue and groove joints, mortise and tenon joints, splice joints, dowel joints, and the like. Outer brace 1120 includes a front portion 1120A, a central C-section 1120B, a rear portion 1120C, an upper ledge 1120D, and a lower ledge 1120E. As shown here, the upper ledge and/or the lower ledge can be discontinuous (e.g. divided by a notch or gap). In some cases, the upper ledge and/or lower ledge can be continuous. Similarly, inner brace 1130 includes a front portion 1130A, a central C-section 1130B, a rear portion 1130C, an upper ledge 1130D, and a lower ledge E. As shown here, the upper ledge and/or the lower ledge can be discontinuous (e.g. divided by a notch or gap). In some cases, the upper ledge and/or lower ledge can be continuous.

Figure 12:
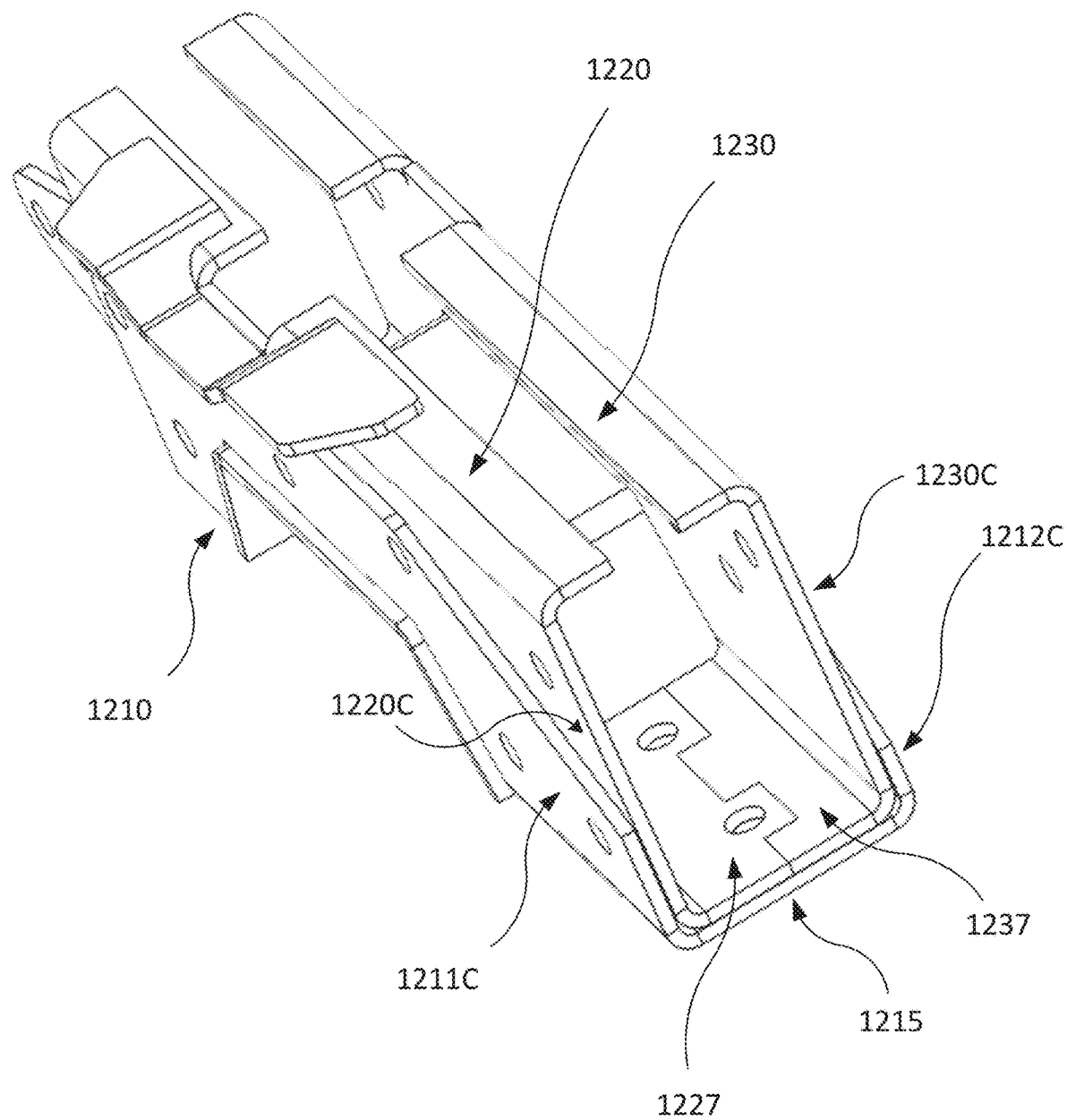
FIG. 12 depicts aspects of a bottom brace, an inner brace, and an outer brace, according to embodiments of the present invention.

FIG. 12 depicts a cooperative (e.g. jointed) engagement between rear engagement section 1227 of the outer brace 1220 and the rear engagement section 1237 of the inner brace 1230, where both sections 1227, 1237 are apposed to rear lower panel 1215 of bottom brace 1210. The rear portion 1220C of the outer brace 1220 is apposed to the rear lower portion 1211C of the outer panel of the bottom brace 1210, and the rear portion 1230C of the inner brace 1230 is apposed to the rear lower portion 1212C of the inner panel of the bottom brace 1210.

Figure 13:
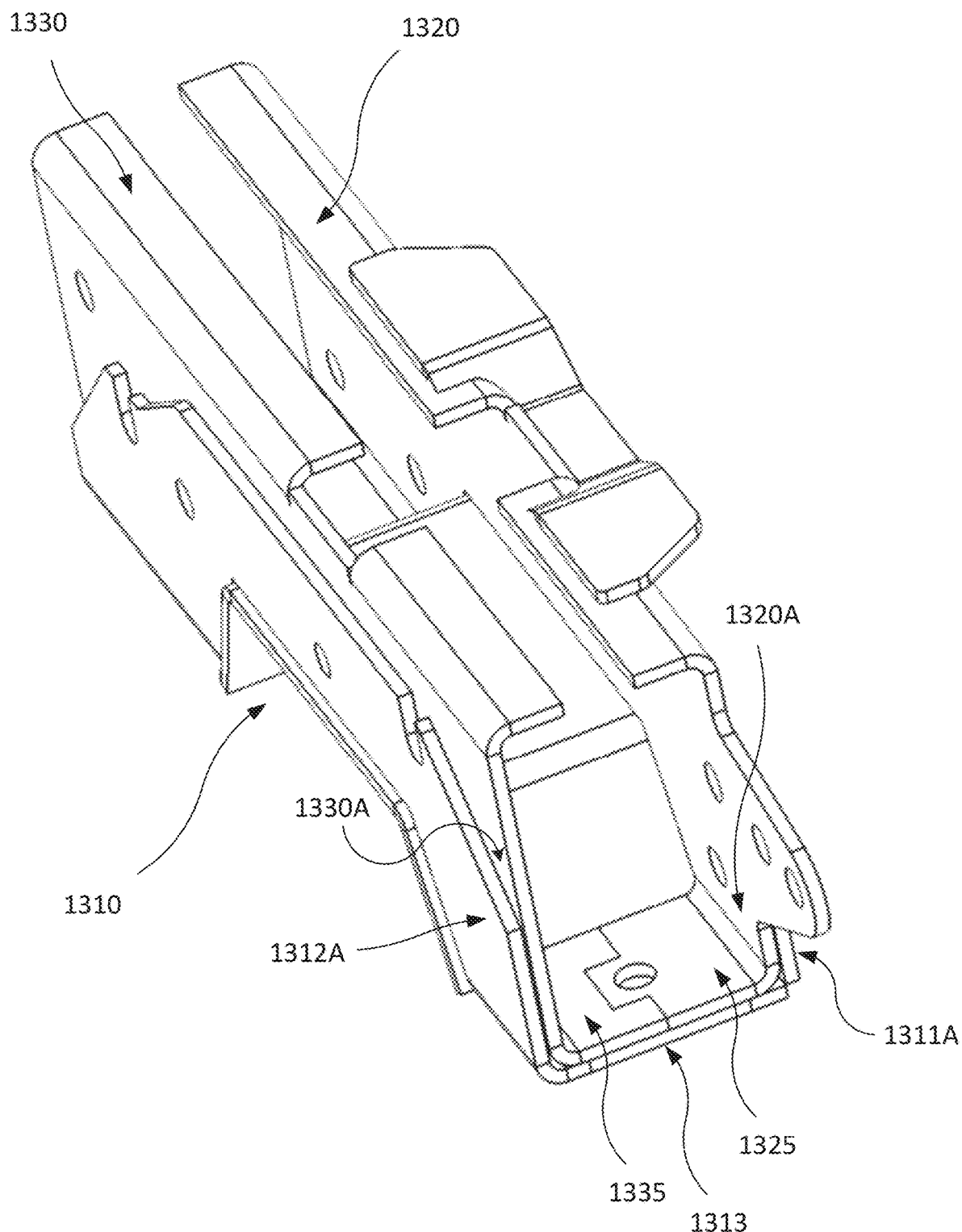
FIG. 13 depicts aspects of a bottom brace, an inner brace, and an outer brace, according to embodiments of the present invention.

FIG. 13 depicts a cooperative (e.g. jointed) engagement between front engagement section 1325 of the outer brace 1320 and the front engagement section 1335 of the inner brace 1330, where both sections 1325, 1335 are apposed to front lower panel 1313 of bottom brace 1310. The front portion 1320A of the outer brace 1320 is apposed to the front lower portion 1311A of the outer panel of the bottom brace 1310, and the front portion 1330A of the inner brace 1330 is apposed to the front lower portion 1312A of the inner panel of the bottom brace 1310.

Figure 14:
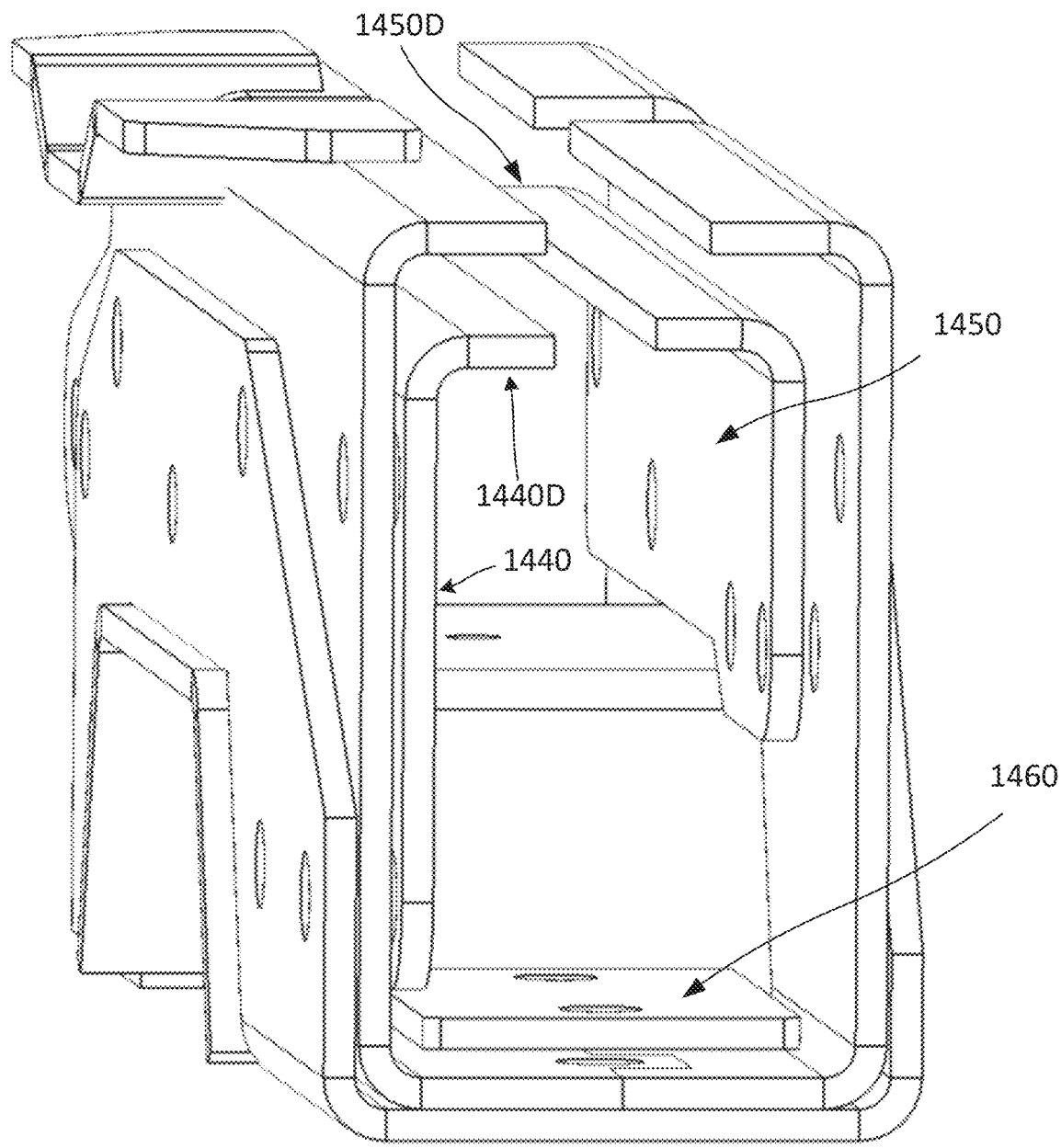
FIG. 14 depicts aspects of a C-notch assembly, according to embodiments of the present invention.
Figure 15:
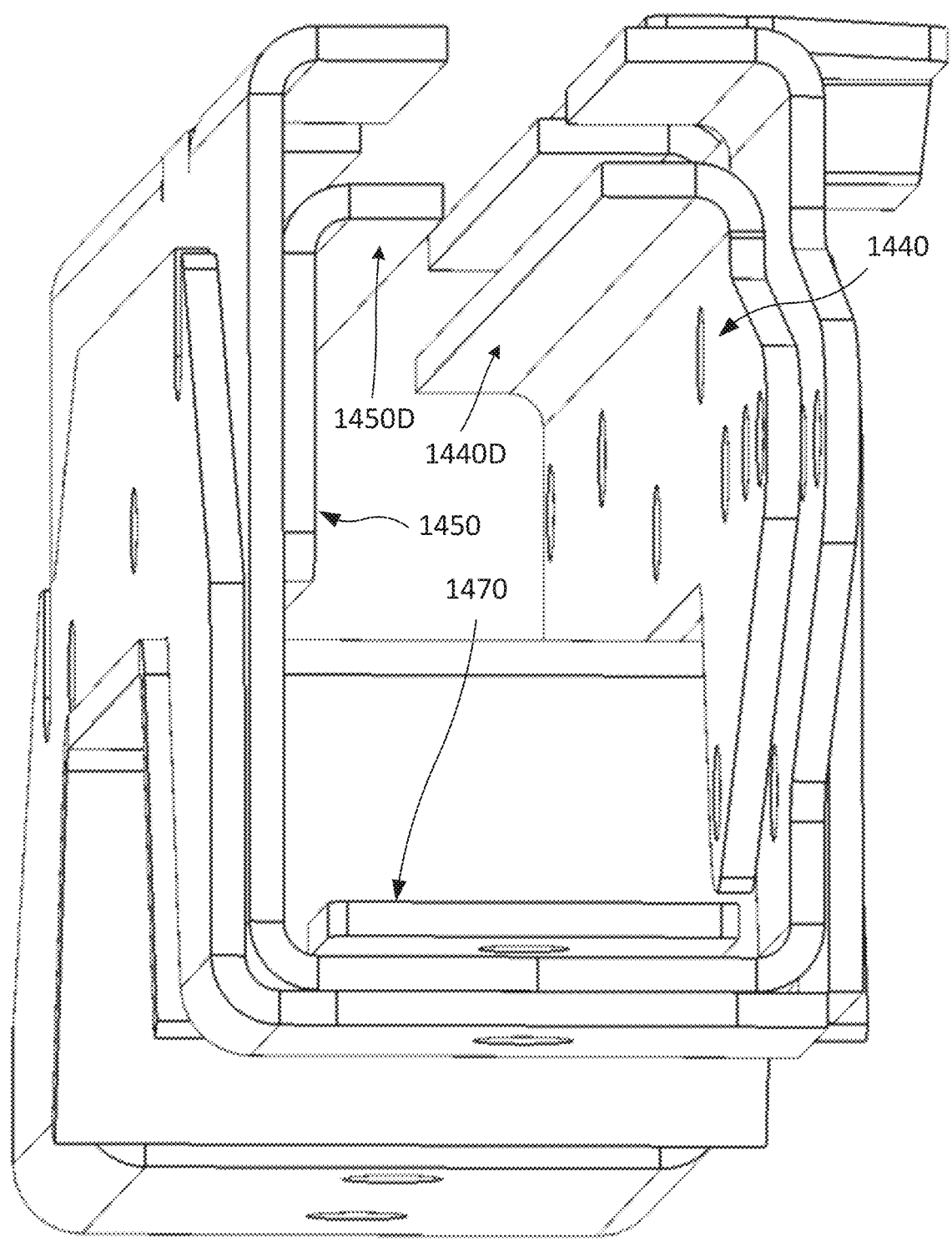
FIG. 15 depicts aspects of a C-notch assembly, according to embodiments of the present invention.

Typically, the combination of structural elements depicted in FIGS. 12 and 13 are disposed external to the frame rail (e.g. box frame rail) of the vehicle. According to some embodiments, the C-notch assembly also includes structural elements that are disposed internal to the frame rail, as well as structural elements that extend through frame rail walls. As depicted in FIGS. 14 and 15, such internally disposed elements include an outer fastener 1440 (having upper ledge 1440D), an inner fastener 1450 (having upper ledge 1450D), a rear bottom fastener 1460, and a front bottom fastener 1470.

Figure 16:
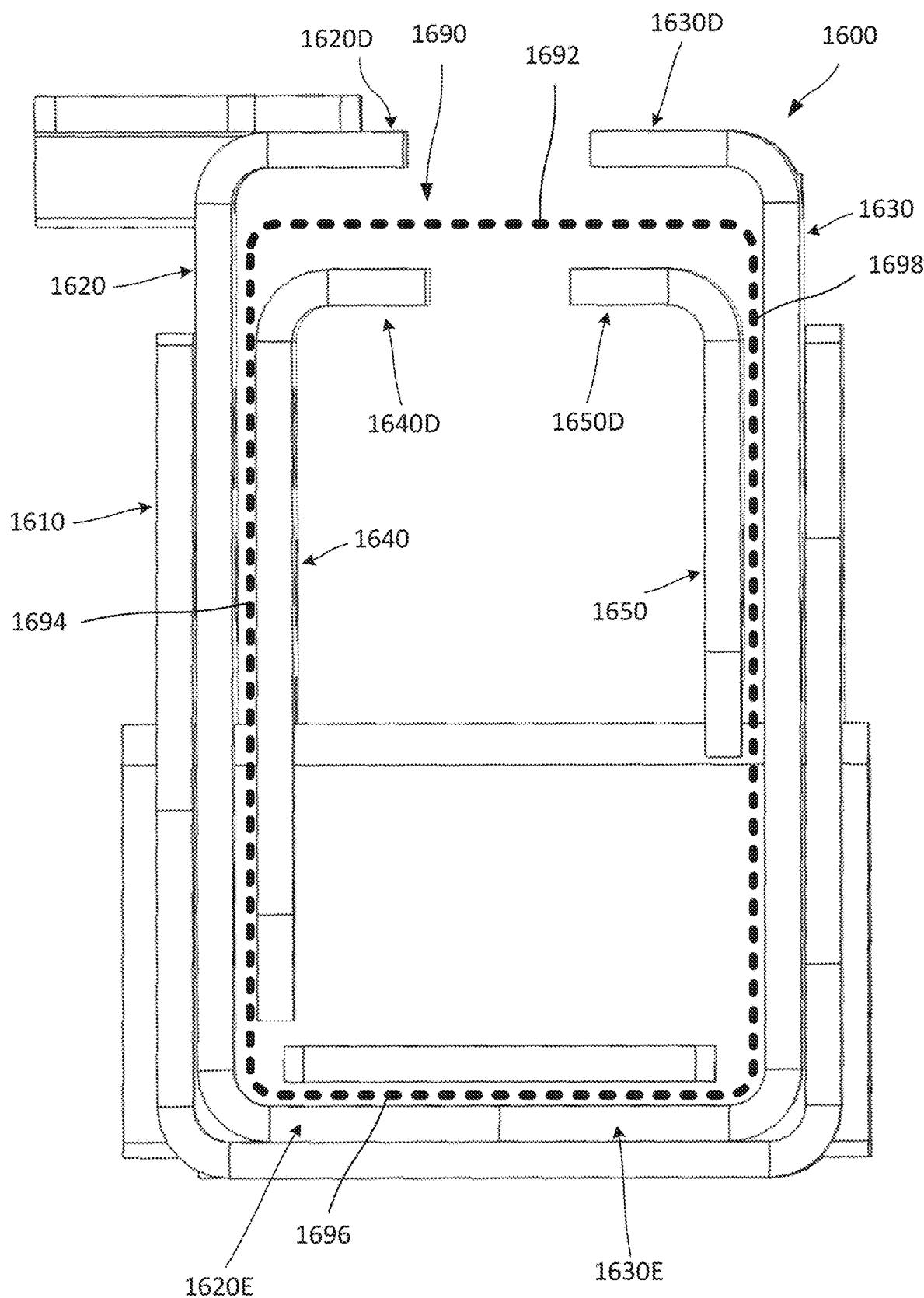
FIG. 16 depicts aspects of a C-notch assembly, according to embodiments of the present invention.

In the rear view provided in FIG. 16, the location of a boxed vehicle frame rail 1690 (cross-section, in dashed line) is shown relative to the structural elements of the C-notch assembly 1600. As illustrated here, frame rail 1690 includes a top wall 1692, an outer wall 1694, a bottom wall 1696, and an inner wall 1698. Outer brace 1620 includes upper ledge 1620D and lower ledge 1620E. Inner brace 1630 includes upper ledge 1630D and lower ledge 1630E. Outer fastener 1640 includes upper ledge 1640D. Inner fastener 1650 includes upper ledge 1650D. As shown here, inner fastener 1650 and outer fastener 1640 are positioned within the interior of the frame rail 1690, and outer brace 1620, inner brace 1630, and bottom brace 1610 are positioned exterior to the frame rail 1690.

Figure 17:
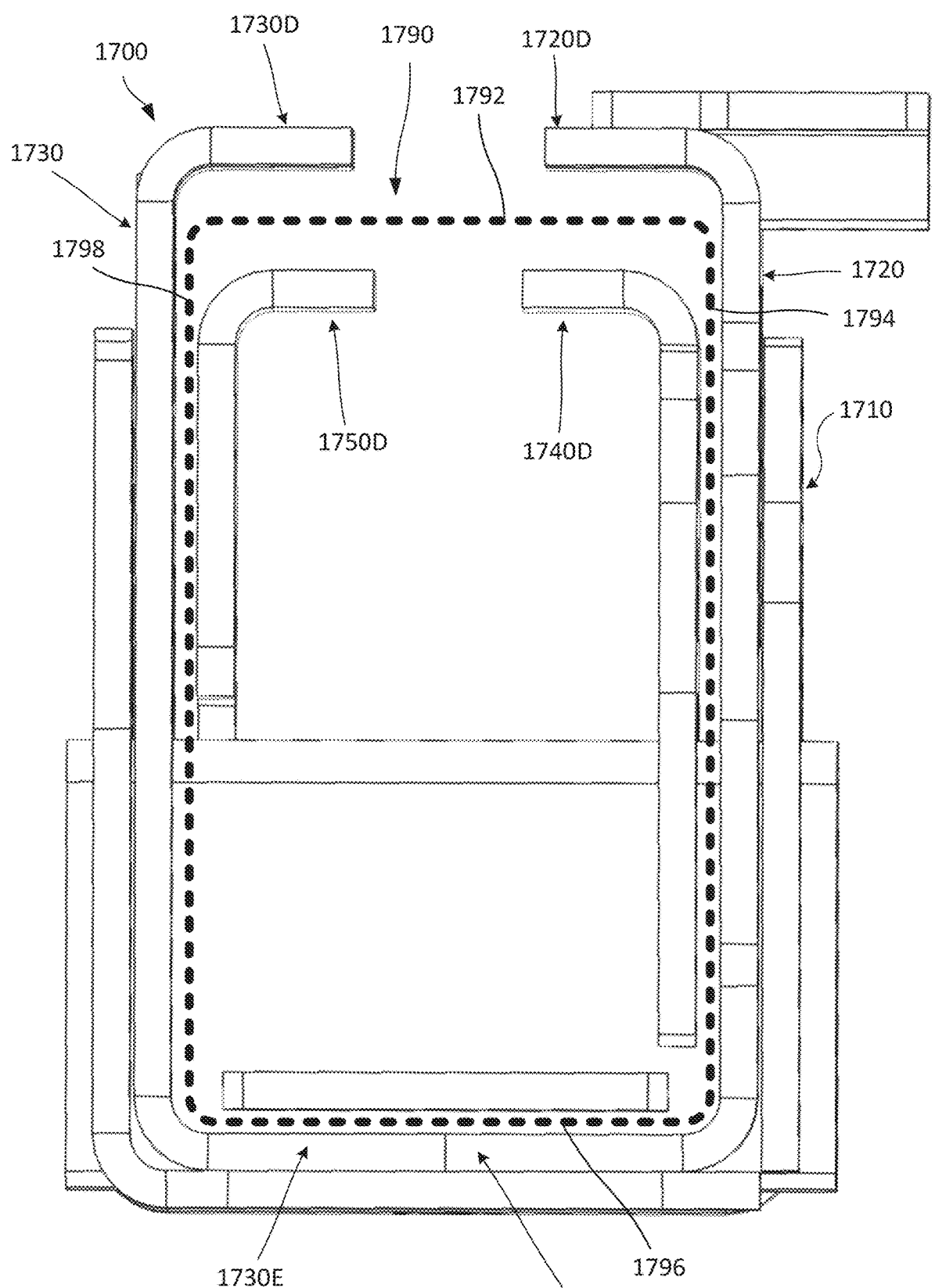
FIG. 17 depicts aspects of a C-notch assembly, according to embodiments of the present invention.

In the front view provided in FIG. 17, the location of a boxed vehicle frame rail 1790 (cross-section, in dashed line) is shown relative to the structural elements of the C-notch assembly 1700. As illustrated here, frame rail 1790 includes a top wall 1792, an outer wall 1794, a bottom wall 1796, and an inner wall 1798. Outer brace 1720 includes upper ledge 1720D and lower ledge 1720E. Inner brace 1730 includes upper ledge 1730D and lower ledge 1730E. Outer fastener 1740 includes upper ledge 1740D. Inner fastener 1750 includes upper ledge 1750D. As shown here, inner fastener 1750 and outer fastener 1740 are positioned within the interior of the frame rail 1790, and outer brace 1720, inner brace 1730, and bottom brace 1710 are positioned exterior to the frame rail 1790.

Figure 18:
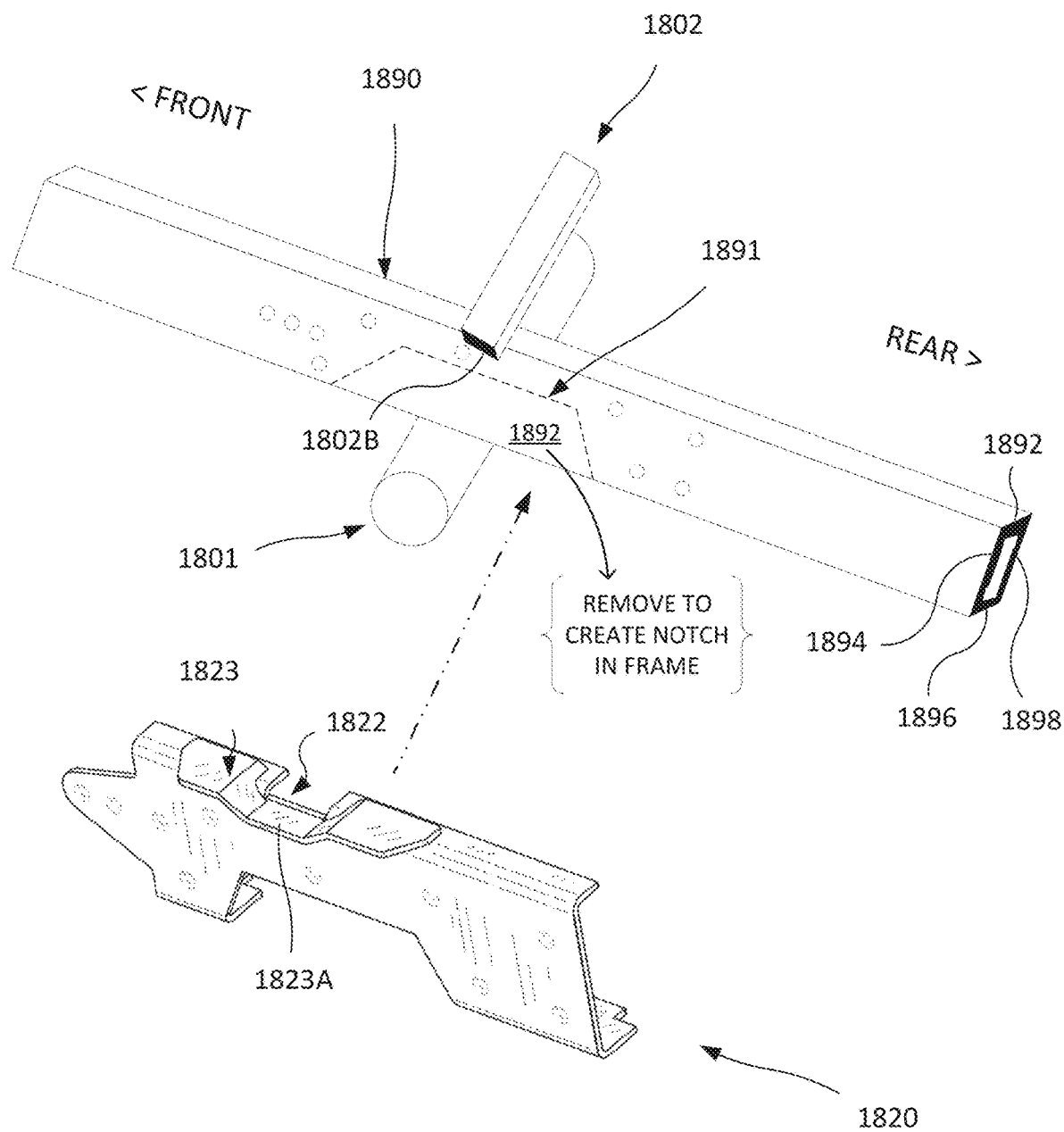
FIG. 18 depicts aspects of a C-notch assembly installation method, according to embodiments of the present invention.

FIG. 18 illustrates a boxed vehicle frame rail 1890 (driver side), a vehicle axle 1801, and a vehicle bed rail 1802. Frame rail 1890 includes a top wall 1892, an outer wall 1894, a bottom wall 1896, and an inner wall 1898. The vehicle bed rail 1802 is disposed above the top wall 1892 of the frame rail 1890. The dashed line 1891 can be created, for example, by placing an outer brace 1820 against the outer wall 1894, such that a top notch 1822 of the outer brace 1820 and/or a seat 1823A of the wing brace 1823 receives or contacts a bottom portion 1802B of the vehicle bed rail 1802. In this way, the dashed line 1891 can be used as a pre-marker for cutting the frame rail 1890. A similar procedure can be performed on the inner all 1898 with an inner brace (not shown here). As shown here, a C-notch can be cut (e.g. with a reciprocating saw) into the frame rail 1890 for example by sawing along dashed line 1891, and then removing the cut frame material 1892, so as to create a notch in the frame. According to some embodiments, the stock bed rail 1802 operates to support the floor of a pickup truck bed, and extends from a driver side frame rail 1890 to a passenger side frame rail (not shown).

Once the appropriate cuts have been made into the vehicle frame rail to create a notch in the frame rail, the C-notch assembly can be assembled onto the frame rail. In some instances, selected structural elements of the C-notch assembly can include welded hex nuts and/or welded bolt studs, so as to facilitate installation of the C-notch assembly onto the vehicle. For example, as shown in FIGS. 19-1 and 19-3, an inner fastener 1950 may include welded hex nuts 1951 welded thereto. During assembly, the inner fastener 1950 can be placed within the interior of the frame rail (not shown), and hex bolts 1952 can be inserted through the inner panel 1912 of the bottom brace 1910, through the inner brace 1930, through the frame rail (not shown), and threaded into the hex nuts 1951. An analogous fastening technique can involve hex nuts (not shown) welded to outer fastener 1940.

Similarly, as depicted in FIGS. 19-2 and 19-3, a rear bottom fastener 1960 can include bolt studs 1961 welded thereto. During assembly, the rear bottom fastener 1960 can be placed within the interior of the frame rail (not shown) with the bolt studs 1961 extending through the frame rail (not shown), through the outer brace 1920, and through the rear lower panel 1915 of the bottom brace 1910, and the hex nuts 1962 can be threaded onto the bolt studs 1961. With reference to FIGS. 12 and 14, it will be understood that rear bottom fastener 1960 can include multiple (e.g. two) bolt studs 1961 for insertion through apertures of the outer brace (or inner brace, if so configured) and bottom brace. An analogous fastening technique can involve bolt studs (not shown) welded to a front bottom fastener (not shown).

The welded nut and welded bolt features help facilitate installation of the C-notch assembly, particularly when installing the C-notch assembly on a boxed frame rail.

Although many of the notch system embodiments disclosed herein are directed to bolt-on C-notch systems, it is understood that other related types of notch systems, such as weld-on notch systems, half circle notch systems, step notch systems, pipe notch systems, deep pipe notch systems, tube-type step notch systems, and the like, can incorporate one or more aspects of the C-notch system embodiments disclosed herein.

All features of the described systems and devices are applicable to the described methods mutatis mutandis, and vice versa. Embodiments of the present invention encompass kits having C-notch systems as disclosed herein. In some embodiments, the kit includes one or more C-notch systems, along with instructions for using or installing the system for example according to any of the methods disclosed herein.

Although the foregoing invention has been described in some detail by way of illustration and example for purposes of clarity of understanding, one of skill in the art will appreciate that certain changes, modifications, alternate constructions, and/or equivalents may be practiced or employed as desired, and within the scope of the appended claims. In addition, each reference provided herein in incorporated by reference in its entirety to the same extent as if each reference was individually incorporated by reference. Relatedly, all publications, patents, patent applications, journal articles, books, technical references, and the like mentioned in this specification are herein incorporated by reference to the same extent as if each individual publication, patent, patent application, journal article, book, technical reference, or the like was specifically and individually indicated to be incorporated by reference.

What is claimed is:

1. A C-notch system for attaching to a frame rail of a vehicle, the system comprising:
    a bottom brace having:
        an outer panel that includes a front portion, a central C-portion, and a rear portion,
        an inner panel that includes a front portion, a central C-portion, and a rear portion,
        a front lower panel disposed between the front portion of the outer panel and the front portion of the inner panel,
        a C-panel disposed between the central C-portion of the outer panel and the central C-portion of the inner panel, and
        a rear lower panel disposed between the rear portion of the outer panel and the rear portion of the inner panel;
    an outer brace having a front portion that includes an upper ledge and a lower ledge, a central C-portion, and a rear portion that includes an upper ledge and a lower ledge;
    an inner brace having a front portion that includes an upper ledge and a lower ledge, a central C-portion, and a rear lower portion that includes an upper ledge and a lower ledge;
    an outer fastener having an upper ledge;
    an inner fastener having an upper ledge;
    a front bottom fastener; and
    a rear bottom fastener.

2. The C-notch system of claim 1, wherein the lower ledge of the outer brace front portion and the lower ledge of the inner brace front portion are configured for a joint engagement.

3. The C-notch system of claim 1, wherein the lower ledge of the outer brace rear portion and the lower ledge of the inner brace rear portion are configured for a joint engagement.

4. The C-notch system of claim 1, wherein the lower ledge of the outer brace front portion and the lower ledge of the inner brace front portion are configured for a finger joint engagement.

5. The C-notch system of claim 1, wherein the lower ledge of the outer brace rear portion and the lower ledge of the inner brace rear portion are configured for a finger joint engagement.

6. The C-notch system of claim 1, wherein the outer fastener includes at least one welded hex nut.

7. The C-notch system of claim 1, wherein the inner fastener includes at least one welded hex nut.

8. The C-notch system of claim 1, wherein the front bottom fastener includes at least one welded bolt stud.

9. The C-notch system of claim 1, wherein the rear bottom fastener includes at least one welded bolt stud.

10. The C-notch system of claim 1, wherein the upper ledge of the outer brace has a gap such that the upper ledge includes a front upper ledge and a rear upper ledge.

11. The C-notch system of claim 1, wherein the upper ledge of the inner brace has a gap such that the upper ledge includes a front upper ledge and a rear upper ledge.

12. A method of installing a C-notch system on a frame rail of a vehicle, the method comprising:
    removing a portion of the frame rail to create a notch;
    positioning an inner fastener within the interior of the frame rail;
    positioning an outer fastener within the interior of the frame rail;
    positioning a front bottom fastener within the interior of the frame rail, in front of the notch;
    positioning a rear bottom fastener within the interior of the frame rail, behind the notch;
    positioning an inner brace exterior to the frame rail;
    positioning an outer brace exterior to the frame rail;
    positioning a bottom brace exterior to the frame rail;
    fixing the outer brace and the outer fastener relative to an outer wall of the frame rail;
    fixing the inner brace and the inner fastener relative to an inner wall of the frame rail;
    fixing the front bottom fastener and a front lower panel of the bottom brace relative to a bottom wall of the frame rail, in front of the notch; and
    fixing the rear bottom fastener and a rear lower panel of the bottom brace relative to the bottom wall of the frame rail, behind the notch.

13. The method of claim 12, further comprising positioning an upper ledge notch of the outer brace to receive a bottom portion of a vehicle bed rail.

14. The method of claim 12, further comprising positioning an upper ledge notch of the inner brace to receive a bottom portion of a vehicle bed rail.

15. The method of claim 12, further comprising positioning a wing brace seat of the outer brace to receive a bottom portion of a vehicle bed rail.

16. The method of claim 12, further comprising engaging a front engagement section of the outer brace with a front engagement section of the inner brace.

17. The method of claim 16, wherein the front engagement section of the outer brace and the front engagement section of the inner brace are engaged with a joint.

18. The method of claim 17, wherein the joint is an interlocking finger joint.

19. The method of claim 12, further comprising engaging a rear engagement section of the outer brace with a rear engagement section of the inner brace.

20. The method of claim 19, wherein the rear engagement section of the outer brace and the rear engagement section of the inner brace are engaged with a joint.

21. The method of claim 20, wherein the joint is an interlocking finger joint.

\* \* \* \* \*